US 12,530,865 B2

(12) United States Patent
Irie et al.

(10) Patent No.: US 12,530,865 B2
(45) Date of Patent: Jan. 20, 2026

(54) INFORMATION PROCESSING DEVICE AND PROGRAM

(71) Applicant: SONY GROUP CORPORATION, Tokyo (JP)

(72) Inventors: Atsushi Irie, Kanagawa (JP); Christopher Wright, London (GB); Bernadette Elliot-Bowman, London (GB); Harm Cronie, Echallens (CH)

(73) Assignee: SONY GROUP CORPORATION, Tokyo (JP)

( * ) Notice: Subject to any disclaimer, the term of this patent is extended or adjusted under 35 U.S.C. 154(b) by 507 days.

(21) Appl. No.: 17/920,276

(22) PCT Filed: Mar. 18, 2021

(86) PCT No.: PCT/JP2021/011196
§ 371 (c)(1),
(2) Date: Oct. 20, 2022

(87) PCT Pub. No.: WO2021/220658
PCT Pub. Date: Nov. 4, 2021

(65) Prior Publication Data
US 2023/0169754 A1    Jun. 1, 2023

(30) Foreign Application Priority Data

Apr. 30, 2020   (JP) .................. 2020-080172

(51) Int. Cl.
G06V 10/764    (2022.01)
G06T 5/50      (2006.01)
G06V 10/74     (2022.01)

(52) U.S. Cl.
CPC .............. *G06V 10/764* (2022.01); *G06T 5/50* (2013.01); *G06V 10/761* (2022.01);
(Continued)

(58) Field of Classification Search
CPC ...... G06V 10/764; G06V 10/761; G06T 5/50; G06T 2207/20081; G06T 2207/20084;
(Continued)

(56) References Cited

U.S. PATENT DOCUMENTS

2018/0268292 A1    9/2018  Choi
2019/0034764 A1*   1/2019  Oh .......................... G06N 3/08
2020/0005183 A1*   1/2020  Tanimoto ............... G06N 3/045

FOREIGN PATENT DOCUMENTS

CN    110765976 A    2/2020
JP    2019-159654 A  9/2019
(Continued)

OTHER PUBLICATIONS

Hanting Chen et al: "Data-Free Learning of Student Networks", Arxiv.Org, Cornell University Library, 201 Olin Library Cornell University Ithaca, NY 14853, Apr. 2, 2019 (Apr. 2, 2019), XP081163669, *the whole document*.

(Continued)

Primary Examiner — Samir A Ahmed
(74) Attorney, Agent, or Firm — Paratus Law Group, PLLC

(57) ABSTRACT

There is provided an information processing device to improve the accuracy of estimation using a student network, the information processing device including an estimation unit that estimates an object class of an object included in an input image using a student network generated based on a teacher network generated by machine learning using images stored in a large-scale image database as training data. The student network is generated by machine learning using, as training data, synthetic images obtained using the teacher network and real environment images acquired by a
(Continued)

plurality of different modalities in a real environment in which estimation by the estimation unit is expected to be executed.

19 Claims, 19 Drawing Sheets

(52) U.S. Cl.
CPC ............... *G06T 2207/20081* (2013.01); *G06T 2207/20084* (2013.01); *G06T 2207/20221* (2013.01)

(58) Field of Classification Search
CPC .......... G06T 2207/20221; G06N 3/045; G06N 3/0895; G06N 3/096
See application file for complete search history.

(56) References Cited

FOREIGN PATENT DOCUMENTS

| | | | |
|---|---|---|---|
| JP | 2020-004178 A | 1/2020 | |
| WO | WO-2020205655 A1 * | 10/2020 | .......... B60W 30/182 |

OTHER PUBLICATIONS

Bhardwaj et al., Dream Distillation: A Data-Independent Model Compression Framework, arXiv.org:1905.07072, May 2019, pp. 1-4.

* cited by examiner

INFORMATION PROCESSING DEVICE AND PROGRAM

CROSS REFERENCE TO PRIOR APPLICATION

This application is a National Stage Patent Application of PCT International Patent Application No. PCT/JP2021/011196 (filed on Mar. 18, 2021) under 35 U.S.C. § 371, which claims priority to Japanese Patent Application No. 2020-080172 (filed on Apr. 30, 2020), which are all hereby incorporated by reference in their entirety.

TECHNICAL FIELD

The present disclosure relates to an information processing device and a program.

BACKGROUND ART

In recent years, neural networks, which are mathematical models that imitate the mechanism of the cranial nerve system, have been attracting attention. In addition, many techniques for improving the efficiency of training by neural networks have been proposed. For example, NPL 1 discloses a technique for generating a student network from a teacher network even when the training data used for training the teacher network cannot be used.

CITATION LIST

Non Patent Literature

[NPL 1] Kartikeya Bhardwaj, and two others, "Dream Distillation: A Data-Independent Model Compression Framework", May 17, 2019, [Online], [Search on Apr. 1, 2020], Internet <https://arxiv.org/pdf/1905.07072.pdf>

SUMMARY

Technical Problem

When an image generated using a teacher network is used for training a student network as in the technique described in NPL 1, in order to improve the accuracy of estimation by the student network, it is important to improve the quality of the image.

Solution to Problem

According to one aspect of the present disclosure, there is provided an information processing device including an estimation unit that estimates an object class of an object included in an input image using a student network generated based on a teacher network generated by machine learning using images stored in a large-scale image database as training data, wherein the student network is generated by machine learning using, as training data, synthetic images obtained using the teacher network and real environment images acquired by a plurality of different modalities in a real environment in which estimation by the estimation unit is expected to be executed.

According to another aspect of the present disclosure, there is provided an information processing device including a training unit that generates a student network based on a teacher network generated by machine learning using images stored in a large-scale image database as training data, wherein the training unit generates the student network by machine learning using, as training data, synthetic images obtained using the teacher network and real environment images acquired by a plurality of different modalities in a real environment in which estimation using the student network is expected to be executed.

According to another aspect of the present disclosure, there is provided a program for causing a computer to function as an information processing device including an estimation unit that estimates an object class of an object included in an input image using a student network generated based on a teacher network generated by machine learning using images stored in a large-scale image database as training data, wherein the student network is generated by machine learning using, as training data, synthetic images obtained using the teacher network and real environment images acquired by a plurality of different modalities in a real environment in which estimation by the estimation unit is expected to be executed.

DESCRIPTION OF EMBODIMENTS

Figure 1:
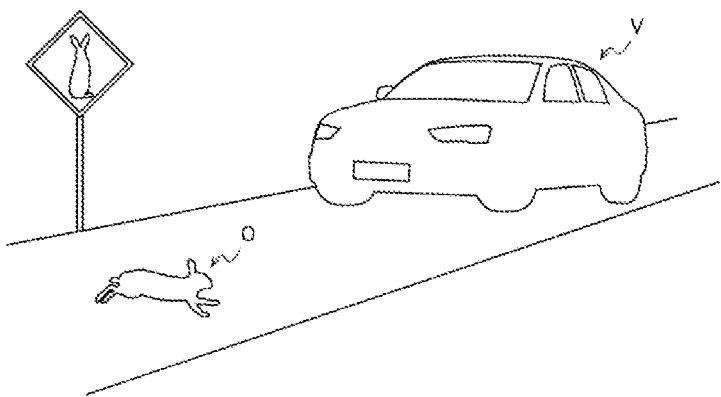
FIG. 1 is a diagram for explaining object class estimation using a student network.

Preferred embodiments of the present disclosure will be described in detail with reference to the accompanying figures below. Also, in the present specification and the figures, components having substantially the same functional configuration will be denoted by the same reference numerals, and thus repeated descriptions thereof will be omitted.

Also, the description will be given in the following order.
1. Embodiment
1.1. Background
1.2. Generation of teacher network
1.3. Generation of synthetic image
1.4. Generation of student network
1.5. Estimation using student network
2. Exemplary hardware configuration
3. Summary

1. Embodiment

1.1. Background

First, an overview of embodiments of the present disclosure will be described. As mentioned above, in recent years, many techniques for improving the efficiency of training by neural networks have been proposed. Such techniques include, for example, a technique called knowledge distillation.

Knowledge distillation is a technique for generating a new network (student network) corresponding to a required specification from a certain high-precision trained network (teacher network).

Knowledge distillation is used, for example, when it is desired to generate a student network that is more suitable for the real environment from a general-purpose teacher network that has been trained using an image provided by a large-scale image database.

However, in order to carry out knowledge distillation, training data used for training the teacher network is generally required. For this reason, if the training data used for training the teacher network is not available, or if the amount of training data that can be used is not sufficient, it may be difficult to generate a student network, or the accuracy of the generated student network may decrease.

On the other hand, NPL 1 discloses a technique for generating a student network without using the training data used for training the teacher network.

The technique disclosed in NPL 1 is to input a real environment image acquired in a real environment to a teacher network to generate a synthetic image, perform machine learning using the synthetic image as training data, and generate a student network.

According to the technique, it is possible to generate a student network based on the teacher network even in a situation where the training data used for generating the teacher network cannot be used. The details of the synthetic image will be described later.

Here, in the generation of the student network using the synthetic image as described above, it is important to improve the quality of the synthetic image used as the training data in order to further improve the accuracy of the generated student network.

Here, a case of generating a student network that estimates an object class of an object included in an input image will be considered.

FIG. 1 is a diagram for explaining object class estimation using a student network. FIG. 1 illustrates a case where an estimation device (not shown) that performs estimation using a student network generated using a synthetic image is mounted on a mobile object V such as an automobile.

The estimation device mounted on the mobile object V estimates, for example, an object class of an object O included in an input captured image in real time, and outputs the estimation result. The object O may be, for example, a wild animal such as a rabbit. According to the above-described estimation, it is possible to detect that the rabbit has jumped out in the traveling direction of the mobile object V and cause the mobile object V to take an avoidance action or the like.

However, here, the estimation accuracy of the object class using the student network is greatly affected by the data used at the time of training. For example, if there is a large discrepancy between the capturing environment of the image used as training data (location, illuminance, distance, noise, object type, and the like) and the capturing environment of the image acquired in the real environment where the estimation is actually performed, the student network may misestimate the object class of object O.

Therefore, the training data used in the generation of the student network is required to be close to the image actually captured in the real environment. This also applies when the above-mentioned synthetic image is used as training data.

The technical idea according to the present disclosure was conceived focusing on the above-described problems, and makes it possible to further improve the accuracy of estimation using the student network.

Therefore, in one embodiment of the present disclosure, a synthetic image may be generated using a real environment image acquired by a plurality of modalities in the real environment, and a student network may be generated using the synthetic image.

Figure 2:
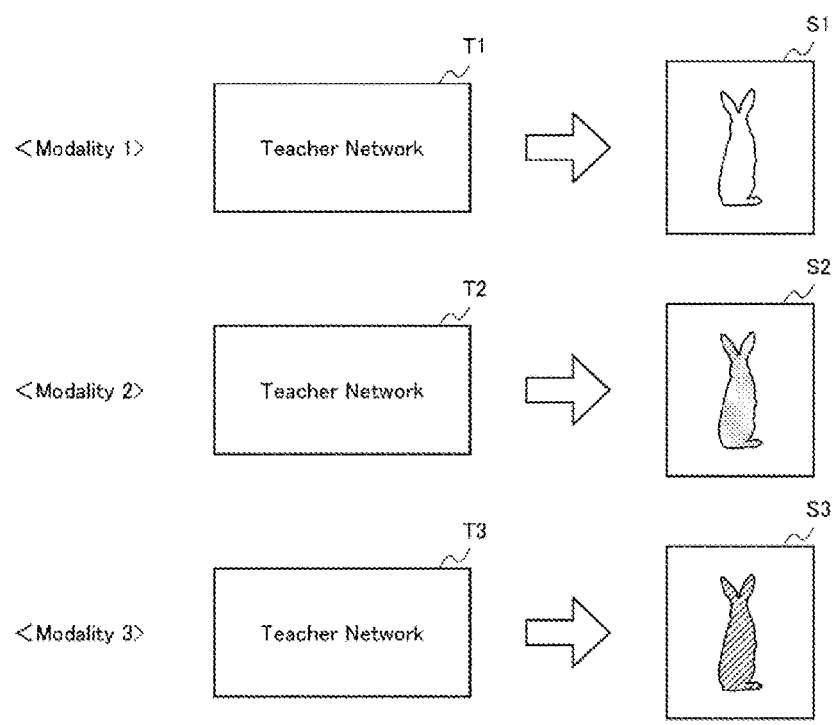
FIG. 2 is a diagram for explaining generation of a synthetic image using a real environment image acquired by a plurality of modalities according to an embodiment of the present disclosure.

FIG. 2 is a diagram for explaining the generation of a synthetic image using a real environment image acquired by a plurality of modalities according to an embodiment of the present disclosure. FIG. 2 shows an example in which teacher networks T1 to T3 corresponding to three different modalities are used to generate synthetic images S1 to S3 related to different modalities.

Here, the modality according to the embodiment of the present disclosure refers to a means for capturing an image. The expression is widely used in the medical field as well, for example, to express the same meaning. Examples of the modality according to the present embodiment include an RGB camera, a ToF camera, LiDAR, a polarized camera, and the like.

For example, when Modality 1 shown in FIG. 2 is an RGB camera, a teacher network T1 uses a pseudo-feature quantity generated by analyzing a feature quantity distribution obtained from a plurality of RGB images captured by the RGB camera in the real environment to update and acquire a synthetic image S1 imitating the RGB images so that the feature quantity obtained when a certain synthetic image is input to the teacher network T1 is close to the pseudo-feature quantity.

For example, when Modality 2 shown in FIG. 2 is a ToF camera, a teacher network T2 uses a pseudo-feature quantity generated by analyzing a feature quantity distribution obtained from a plurality of ToF images captured by the ToF camera in the real environment to update and acquire a synthetic image S2 imitating the ToF images so that the feature quantity obtained when a certain synthetic image is input to the teacher network T2 is close to the pseudo-feature quantity.

For example, when Modality 3 shown in FIG. 2 is a polarized camera, a teacher network T3 uses a pseudo-feature quantity generated by analyzing a feature quantity distribution obtained from a plurality of polarized images captured by the polarized camera in the real environment to update and acquire a synthetic image S3 imitating the polarized images so that the feature quantity obtained when a certain synthetic image is input to the teacher network T3 is close to the pseudo-feature quantity.

In the synthetic images S1 to S3 shown in FIG. 2, the difference between modalities is expressed depending on the type or presence of the texture.

As described above, the synthetic image according to an embodiment of the present disclosure may be generated using the real environment image acquired by a plurality of different modalities and the teacher network.

For example, as shown in FIG. 2, the synthetic image according to the present embodiment can be generated based on inputting the real environment image acquired by the corresponding modality to each of the plurality of teacher networks T1 to T3 corresponding to a single modality.

One of the features of the student network according to the embodiment of the present disclosure is that it is generated using the synthetic image generated as described above as training data.

According to the above-described feature, the characteristics of the object O (for example, information on shape, color, distance, deflection, and the like) that can appear in the image acquired by each modality can be widely and effectively learned by the student network, and the estimation accuracy by the student network can be improved.

Figure 3:
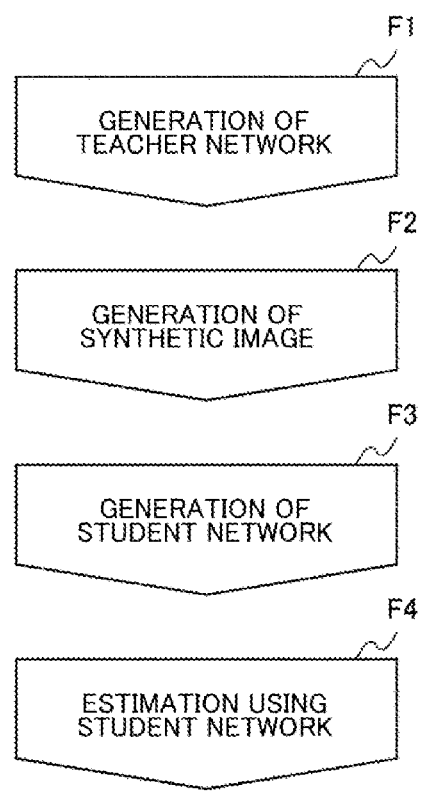
FIG. 3 is a diagram for explaining an outline of four phases according to the embodiment.

The realization of estimation using the student network according to an embodiment of the present disclosure is roughly divided into four phases. FIG. 3 is a diagram for explaining an outline of the four phases according to an embodiment of the present disclosure.

Phase F1 according to one embodiment of the present disclosure is a phase for generating a teacher network.

Phase F2 according to one embodiment of the present disclosure is a phase for generating a synthetic image using the teacher network generated in Phase F1.

Phase F3 according to one embodiment of the present disclosure is a phase for generating a teacher network using the synthetic image generated in Phase F2.

Phase F4 according to one embodiment of the present disclosure is a phase of performing estimation using the student network generated in phase F3.

Hereinafter, the processing in each of the above-described phases will be described in detail.

1.2. Generation of Teacher Network

First, a method for generating a teacher network in Phase F1 will be described. In Phase F1 according to the present embodiment, a teacher network is generated using a first training device 10.

Figure 4:
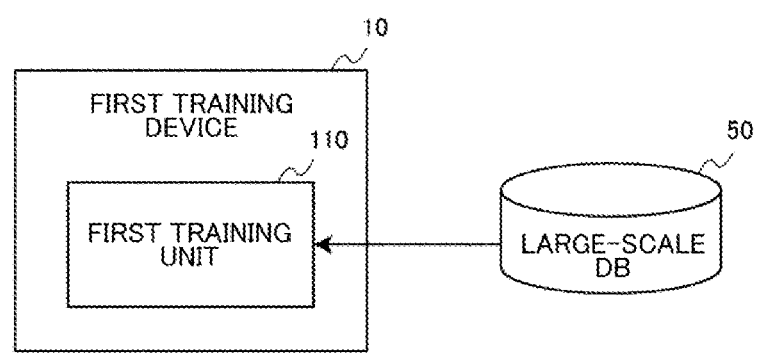
FIG. 4 is a block diagram showing an exemplary configuration of a first training device 10 according to the embodiment.

FIG. 4 is a block diagram showing an exemplary configuration of the first training device 10 according to the present embodiment. As shown in FIG. 4, the first training device 10 according to the present embodiment includes at least a first training unit 110. The first training device 10 may further include, for example, an operation unit that accepts operations by the user, a display unit that displays various pieces of information, and the like.

(First Training Unit 110)

The first training unit 110 according to the present embodiment performs machine learning using an image stored in a large-scale DB 50 as training data, and generates a teacher network.

As for the generation of the teacher network by the first training unit 110, a generally widely used method may be adopted, and therefore, description of a detailed flow will be omitted. The large-scale DB 50 used to generate the teacher network includes, for example, various databases available on the Internet and widely used in research and development in the field of machine learning. By generating the teacher network using data with high estimation accuracy, it is possible to improve the accuracy of estimation by the student network generated later.

The first training device 10 may be set in an environment different from that of the image generation device 20 and the second training device 30, which will be described later.

1.3. Generation of Synthetic Image

Next, a method for generating a synthetic image in Phase F2 will be described. In Phase F2 according to the present embodiment, a synthetic image is generated using the image generation device 20.

Figure 5:
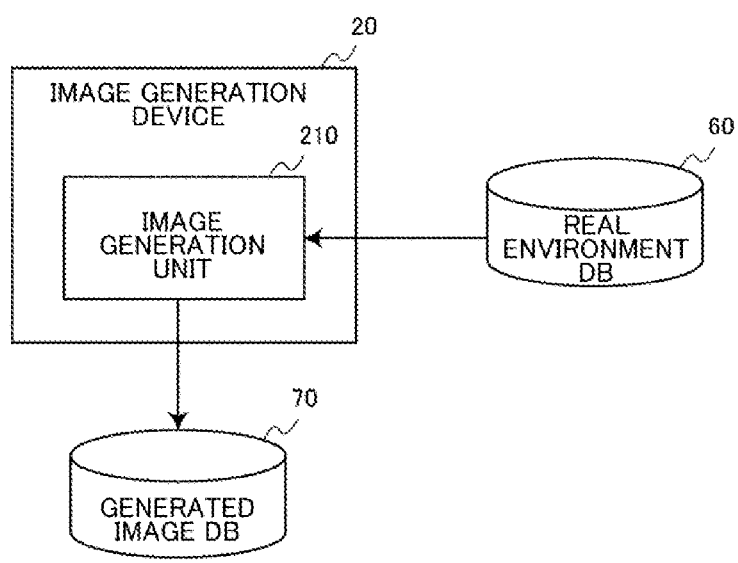
FIG. 5 is a block diagram showing an exemplary configuration of an image generation device 20 according to the embodiment.

FIG. 5 is a block diagram showing an exemplary configuration of the image generation device 20 according to the present embodiment. As shown in FIG. 5, the image generation device 20 according to the present embodiment includes at least an image generation unit 210. The first training device 10 may further include, for example, an operation unit that accepts operations by the user, a display unit that displays various pieces of information, and the like.

The image generation device 20 according to the present embodiment is installed at a main development site. The development site includes a cloud environment.

(Image Generation Unit 210)

The image generation unit 210 according to the present embodiment generates a synthetic image using the teacher network generated in Phase F1 and the real environment images acquired by a plurality of different modalities in the real environment in which the estimation by the student network generated in Phase 3 is expected to be executed.

The image generation unit 210 according to the present embodiment generates a synthetic image using, for example, the real environment image stored in a real environment DB 60, and stores the generated synthetic image in a generated image DB 70.

The synthetic image according to the present embodiment may be generated based on adding noise to the feature quantity obtained by inputting the real environment image to the teacher network.

Figure 6:
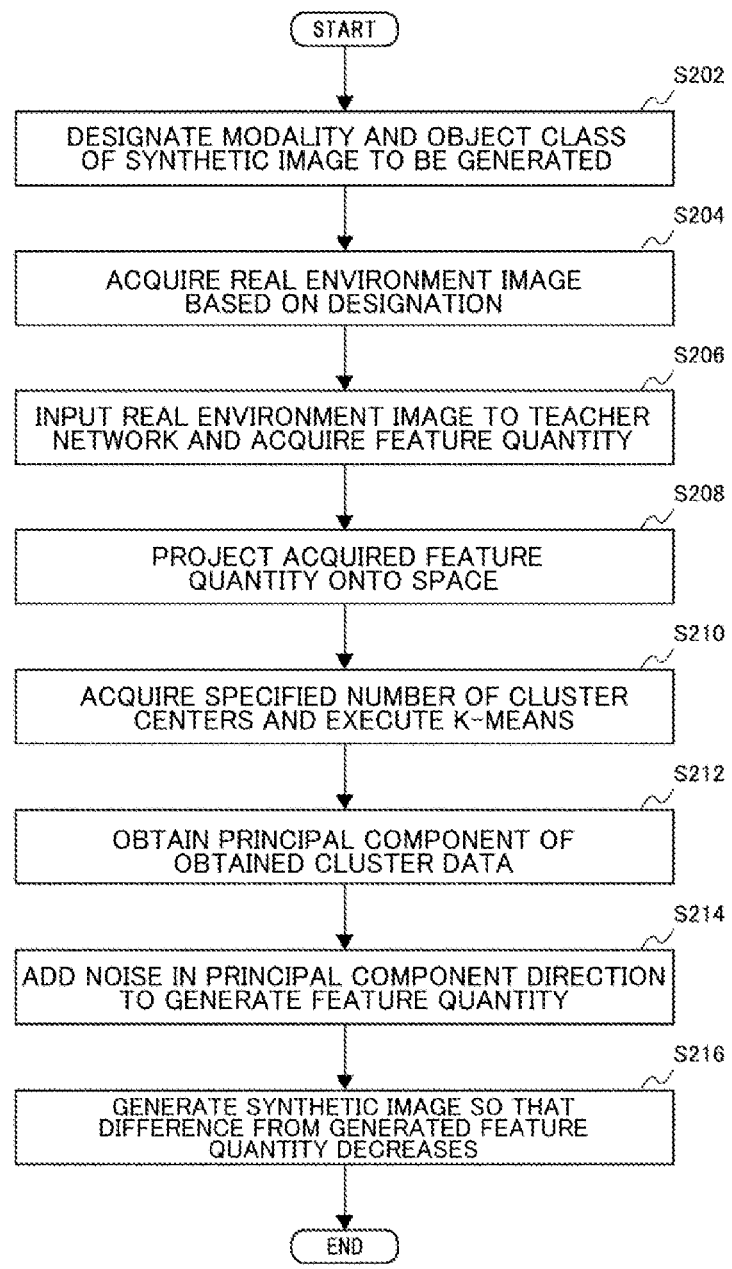
FIG. 6 is a flowchart showing a flow of synthetic image generation using an image generation unit 210 according to the embodiment.

Hereinafter, the generation of the synthetic image by the image generation unit 210 according to the present embodiment will be described in detail. FIG. 6 is a flowchart showing a flow of synthetic image generation using the image generation unit 210 according to the present embodiment.

In Phase F2 according to the present embodiment, first, the modality and the object class related to the synthetic image to be generated are designated (S202). The designation may be made by a user (developer, and the like).

Next, the image generation unit 210 acquires the corresponding real environment image from the real environment DB 60 based on the modality and the object class designated in step S202 (S204).

Next, the image generation unit 210 inputs the real environment image acquired in step S204 to the teacher network and acquires the feature quantity (S206). The feature quantity may be a feature quantity after average pooling in the teacher network.

Next, the image generation unit 210 projects the feature quantity acquired in step S206 onto a certain space using t-SNE or the like (S208).

The image generation unit 210 repeatedly executes the processes of steps S204 to S208 until a sufficient number of pieces of data is collected.

Here, when a sufficient number of pieces of data is collected, the image generation unit 210 acquires a specified number of cluster centers and executes K-means (S210).

Next, the image generation unit 210 obtains principal components from the cluster data obtained in step S210 (S212). It should be noted that the projection onto the space using the above-described t-SNE or the like does not necessarily have to be executed in step S208.

Next, the image generation unit 210 generates a new feature quantity by adding noise in the principal component direction obtained in step S212 (S214).

That is, it can be said that the synthetic image according to the present embodiment is generated based on adding noise in the principal component direction in the feature quantity distribution obtained by inputting the real environment image to the teacher network.

Subsequently, the image generation unit 210 generates a synthetic image so that the difference between the feature quantity acquired in step S206 and the feature quantity generated in step S214 decreases (S216).

That is, it can be said that the synthetic image according to the present embodiment is generated so that the difference between the feature quantity after average pooling obtained by inputting the real environment image to the teacher network and the feature quantity in which noise is added to the feature quantity in the principal component direction decreases.

The processing can be expressed by the following mathematical formula (1).

[Math. 1]
$$\min_{X_i} \|g(X_i) - t_i\|_2^2 \; i \in \{1, \ldots, n\} \quad (1)$$

In the above-described formula (1), $X_i$ is the generated synthetic image, $g(X_i)$ is the feature quantity after average pooling in the teacher network when X is input, and $t_i$ is the feature quantity generated by adding noise in the principal component direction.

The image generation unit 210 according to the present embodiment repeatedly executes the processes of steps S214 and S216 until a predetermined number of synthetic images are generated.

When generating a synthetic image related to another modality or object class, the image generation unit 210 may return to step S202 and repeatedly execute the following processing.

The flow of synthetic image generation according to the present embodiment has been described above. For a more detailed method, refer to NPL 1 described above.

1.4. Generation of Student Network

Next, a method for generating a student network in Phase F3 will be described. In Phase F3 according to the present embodiment, the student network is generated using the second training device 30. The second training device 30 according to the present embodiment is an example of an information processing device that generates a student network by machine learning using the synthetic image generated in Phase F2 as training data.

Figure 7:
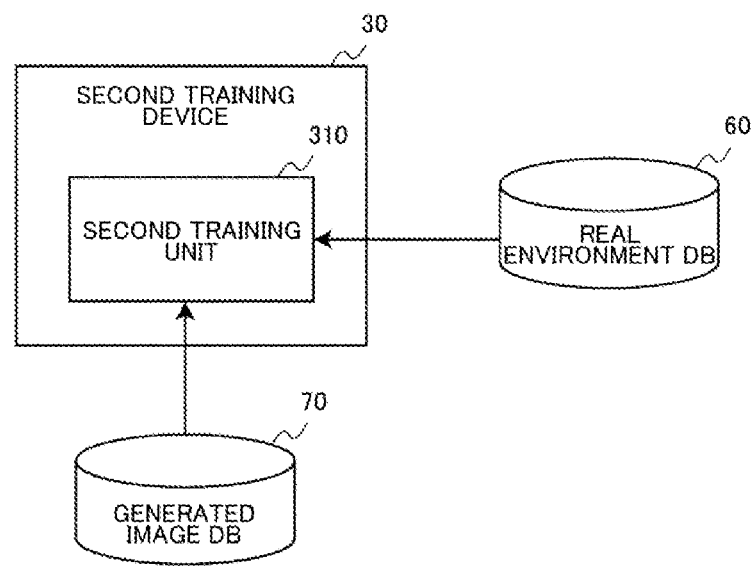
FIG. 7 is a block diagram showing an exemplary configuration of a second training device 30 according to the embodiment.

FIG. 7 is a block diagram showing an exemplary configuration of the second training device 30 according to the present embodiment. As shown in FIG. 7, the second training device 30 according to the present embodiment includes at least a second training unit 310. The first training device 10 may further include, for example, an operation unit that accepts operations by the user, a display unit that displays various pieces of information, and the like.

The second training device 30 according to the present embodiment is installed at a main development site. The development site includes a cloud environment.

(Second Training Unit 310)

The second training unit 310 according to the present embodiment is an example of a training unit that generates a student network based on a teacher network generated by machine learning using an image stored in a large-scale DB 50 as training data. One of the features of the second training unit 310 according to the present embodiment is to generate a student network by machine learning using, as training data, the synthetic image obtained using the teacher network and the real environment image acquired by a plurality of different modalities in the real environment in which estimation using the student network is expected to be executed.

For example, the second training unit 310 according to the present embodiment acquires the synthetic image generated in Phase F2 from the generated image DB 70 and uses the synthetic image as training data to generate a student network. The second training unit 310 may use the real environment image stored in the real environment DB as training data.

At this time, the second training unit 310 according to the present embodiment may use only the real environment image and the synthetic image which is predicted to further improve the accuracy of estimation by the student network among the synthetic images stored in the generated image DB 70 as training data.

The selection of synthetic images as described above makes it possible to more effectively improve the accuracy of estimation by the generated student network.

For example, the second training unit 310 according to the present embodiment may use, among the generated synthetic images, synthetic images whose degree of similarity between different modalities exceeds a threshold value as training data.

Figure 8:
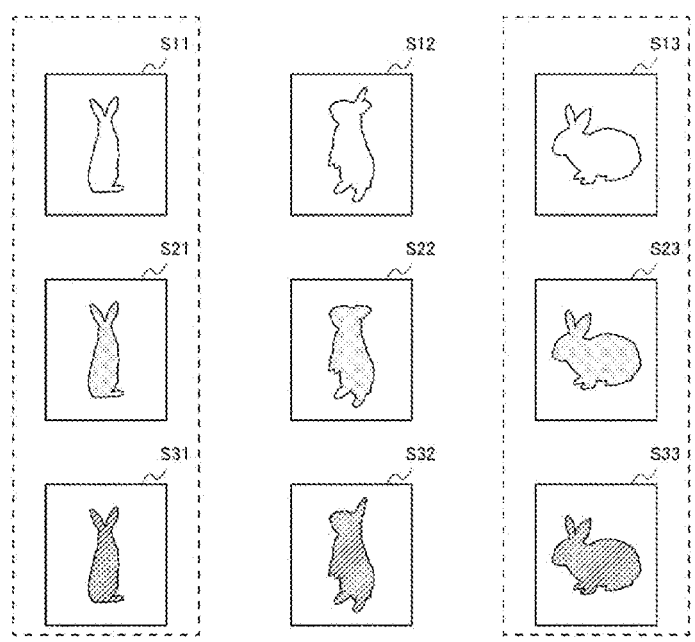
FIG. 8 is a diagram for explaining synthetic images having a high degree of similarity between different modalities according to the embodiment.

FIG. 8 is a diagram for explaining synthetic images having a high degree of similarity between different modalities according to the present embodiment. FIG. 8 illustrates synthetic images S11 to S13, S21 to S23, and S31 to S33 related to the object class "rabbit". Here, it is assumed that the synthetic images S11 to S13, S21 to S21, and S31 to S33 are related to different modalities.

In the case of the example shown in FIG. 8, in the synthetic images S22 and S32, one ear of the rabbit as the subject is missing, and the degree of similarity with the synthetic image S12 is low. Thus, synthetic images having a low degree of similarity between different modalities may be excluded from the training data.

According to the acceptance/rejection determination of the synthetic image based on the degree of similarity between different modalities as described above, it is expected that the accuracy of estimation by the generated student network will be effectively improved.

The above-mentioned acceptance/rejection determination is expected to be particularly effective when data having almost the same shape in all modalities can be acquired.

The degree of similarity may be calculated using techniques such as template matching and feature point matching. In the above-mentioned degree-of-similarity calculation, deep learning or the like for determining a similar image may be used.

Figure 9:
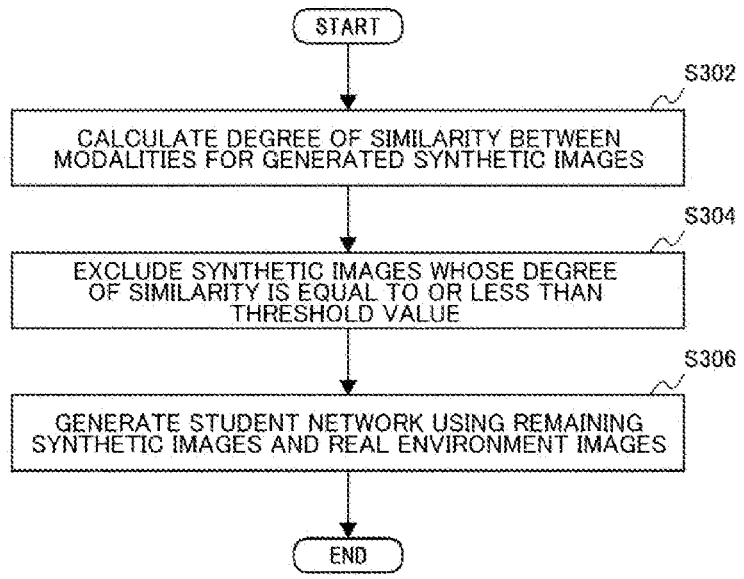
FIG. 9 is a flowchart showing a flow of acceptance/rejection determination and training of a synthetic image based on the degree of similarity between modalities according to the embodiment.

FIG. 9 is a flowchart showing a flow of acceptance/rejection determination and training of a synthetic image based on the degree of similarity between modalities according to the present embodiment.

First, the second training unit 310 calculates the degree of similarity of the generated synthetic images between different modalities (S302).

Next, the second training unit 310 excludes synthetic images whose degree of similarity calculated in step S302 is equal to or less than the threshold value (S304).

Next, the second training unit 310 performs training using the remaining synthetic image and the real environment image as training data, and generates a student network (S306).

As described above, the student network according to the present embodiment may be generated by machine learning using synthetic images whose degree of similarity between different modalities exceeds the threshold value among the generated synthetic images.

On the other hand, the second training unit 310 according to the present embodiment may use, among the generated synthetic images, synthetic images whose degree of similarity in the same modality exceeds the threshold value as training data.

Figure 10:
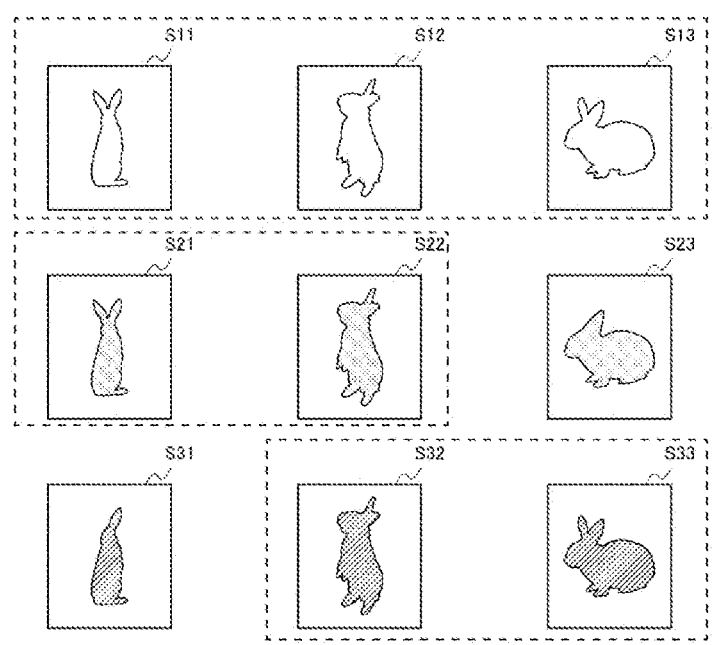
FIG. 10 is a diagram for explaining a synthetic image having a high degree of similarity within the same modality according to the embodiment.

FIG. 10 is a diagram for explaining synthetic images having a high degree of similarity within the same modality according to the present embodiment. FIG. 10 illustrates synthetic images S11 to S13, S21 to S23, and S31 to S33 related to the object class "rabbit". Here, it is assumed that the synthetic images S11 to S13, S21 to S21, and S31 to S33 are related to different modalities.

In the case of the example shown in FIG. 10, the synthetic image S23 lacks one ear of the rabbit as the subject, and has a low degree of similarity to the synthetic images S21 and S22 related to the same modality. Similarly, the synthetic image S31 lacks one ear of the rabbit, which is the subject, and has a low degree of similarity to the synthetic images S32 and S33 related to the same modality. Thus, synthetic images having a low degree of similarity within the same modality may be excluded from the training data.

According to the acceptance/rejection determination of the synthetic image based on the degree of similarity within the same modality as described above, it is expected that the accuracy of estimation by the generated student network will be effectively improved.

It is expected that the above-mentioned acceptance/rejection determination is particularly effective when the shape change in the modality is small. In this case, the acceptance/rejection determination based on the degree of similarity within the same modality is different from the acceptance/rejection determination based on the degree of similarity between different modalities, and is effective even when the feature quantity distributions of each modality are not similar.

Figure 11:
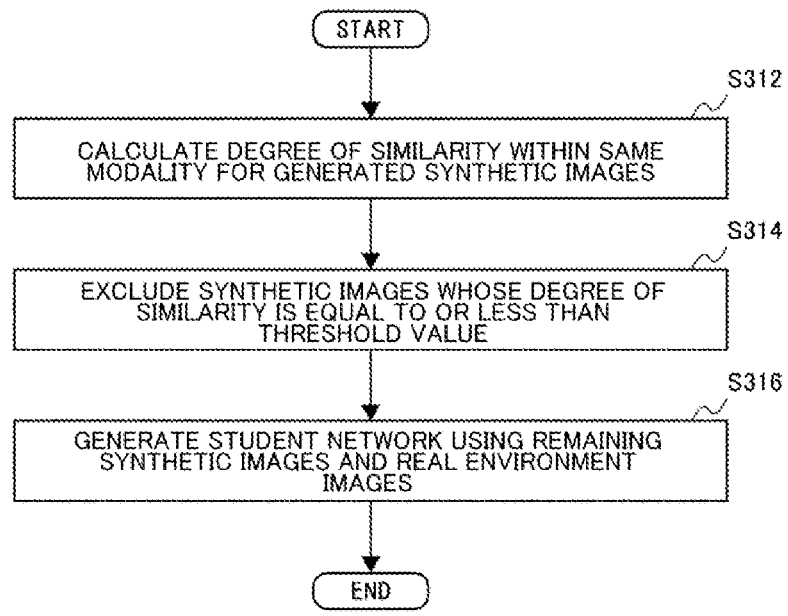
FIG. 11 is a flowchart showing a flow of acceptance/rejection determination and training of a synthetic image based on the degree of similarity within the modality according to the embodiment.

FIG. 11 is a flowchart showing a flow of acceptance/rejection determination and training of a synthetic image based on the degree of similarity in the modality according to the present embodiment.

First, the second training unit 310 calculates the degree of similarity within the same modality for the generated synthetic images (S312).

Next, the second training unit 310 excludes synthetic images whose degree of similarity calculated in step S312 is equal to or less than the threshold value (S314).

Next, the second training unit 310 performs training using the remaining synthetic image and the real environment image as training data, and generates a student network (S316).

As described above, the student network according to the present embodiment may be generated by machine learning using synthetic images whose degree of similarity in the same modality exceeds the threshold value among the generated synthetic images.

In the above description, the case of selecting a synthetic image to be adopted as training data from a plurality of generated synthetic images has been described. On the contrary, the second training unit 310 according to the present embodiment may generate a new synthetic image by fusing a plurality of generated synthetic images, and use the new synthetic image as training data. In the following, the new synthetic image will be referred to as a fusion image.

That is, the student network according to the present embodiment may be generated by machine learning using a fusion image obtained by fusing a plurality of generated synthetic images.

Figure 12:
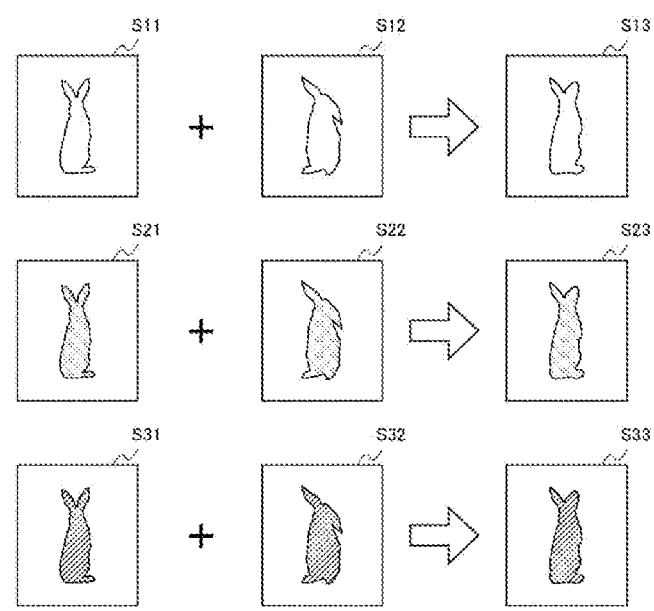
FIG. 12 is a diagram showing an example of a fusion image according to the embodiment.

FIG. 12 is a diagram showing an example of a fusion image according to the present embodiment. FIG. 12 illustrates a fusion image S13 generated by fusing synthetic images S11 and S12 related to the same modality. Similarly, FIG. 12 illustrates a fusion image S23 generated by fusing synthetic images S21 and S22 related to the same modality. Similarly, FIG. 12 illustrates a fusion image S33 generated by fusing synthetic images S31 and S32 related to the same modality.

As illustrated in FIG. 12, the fusion image according to the present embodiment may be generated by fusing a plurality of synthetic images related to the same object class among the generated synthetic images.

The fusion image according to the present embodiment may be generated by fusing a plurality of synthetic images whose degree of similarity within the same modality exceeds a threshold value among the generated synthetic images.

In the above-described case, processing such as alignment and rotation may be performed in order to increase the degree of similarity.

If the degree of similarity is sufficiently high, a fusion image may be generated by fusing synthetic images related to different modalities.

By generating the fusion image as described above, it is possible to generate data that cannot be expressed in the feature quantity space, and to improve the diversity of the training data.

Figure 13:
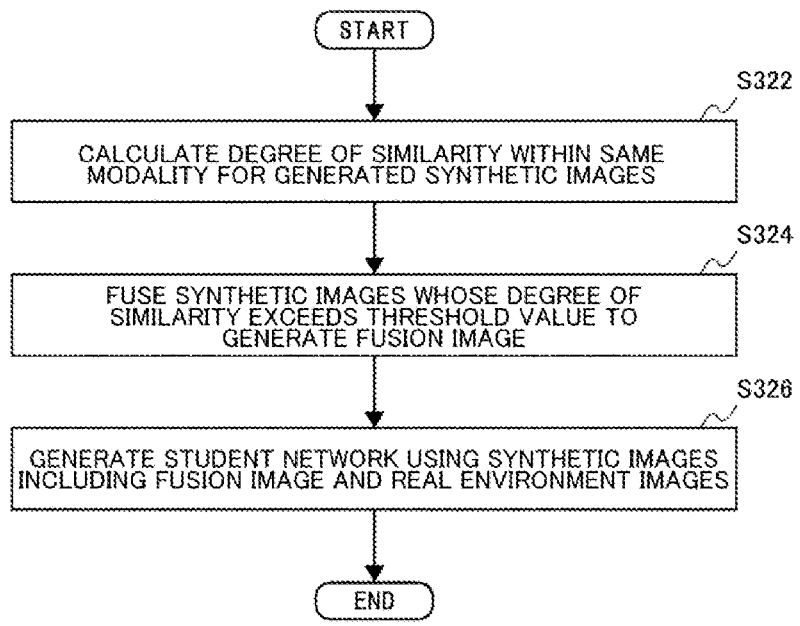
FIG. 13 is a flowchart showing a flow of generation and training of a fusion image within the same modality according to the embodiment.

FIG. 13 is a flowchart showing a flow of generation and training of a fusion image within the same modality according to the present embodiment.

First, the second training unit 310 calculates the degree of similarity of the generated synthetic images within the same modality (S322).

Next, the second training unit 310 fuses synthetic images whose degree of similarity exceeds the threshold value calculated in step S322 to generate a fusion image (S324).

Next, the second training unit 310 performs training using the synthetic images including the fusion image generated in step S324 and the real environment image as training data, and generates a student network (S326). In this case, an image obtained by fusing a plurality of real environment images may be used as training data.

Figure 14:
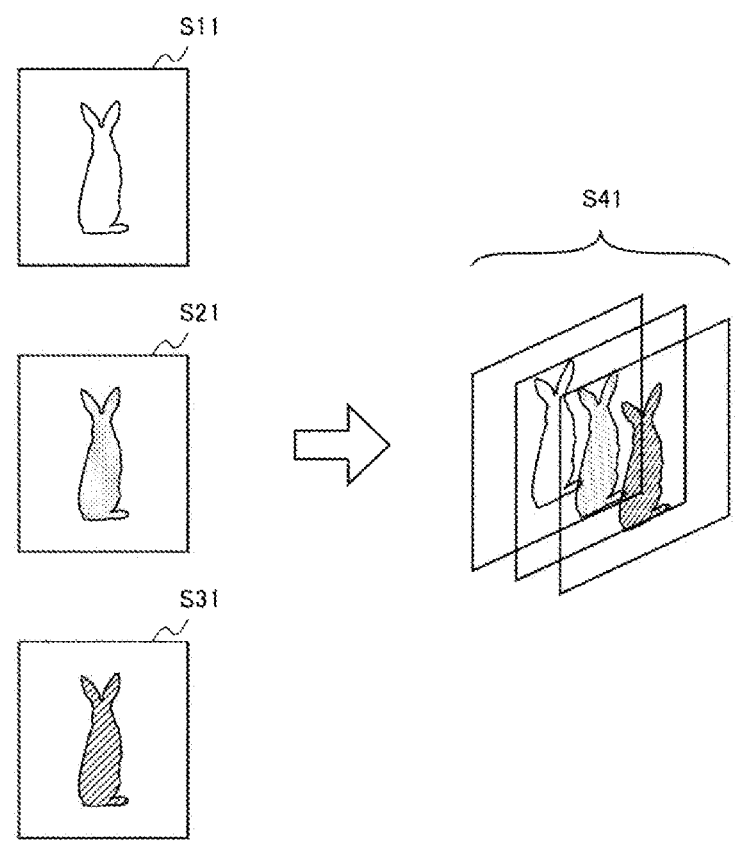
FIG. 14 is a diagram for explaining a fusion image focusing on a plurality of different modalities according to the embodiment.

Next, a fusion image focusing on a plurality of different modalities according to the present embodiment will be described. FIG. 14 is a diagram for explaining a fusion image focusing on a plurality of different modalities according to the present embodiment.

FIG. 14 illustrates a fusion image S41 generated by concatenating the synthetic images S11, S21, and S31, which are synthetic images related to different modalities and the synthetic images S11, S21, and S31.

As described above, the fusion image according to the present embodiment may be generated by concatenating synthetic images related to a plurality of different modalities.

More specifically, the fusion image according to the present embodiment may be generated by concatenating a plurality of generated synthetic images whose degree of similarity between different modalities exceeds a threshold value in the channel direction.

In the above-described case, processing such as alignment and rotation may be performed in order to increase the degree of similarity.

The generation of the fusion image as described above is expected to be particularly effective when data having almost the same shape can be obtained in all modalities. In addition, according to the fusion image as described above, it is expected that the accuracy of estimation by the generated student network will be improved because the information of all modalities can be utilized.

Figure 15:
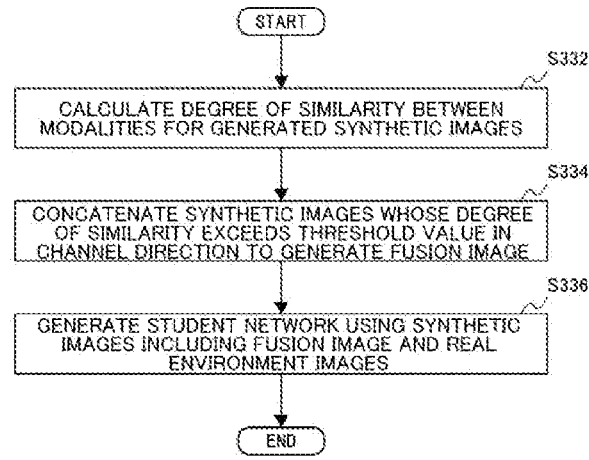
FIG. 15 is a flowchart showing a flow of generation and training of a fusion image between different modalities according to the embodiment.

FIG. 15 is a flowchart showing a flow of generation and training of a fusion image between different modalities according to the present embodiment.

First, the second training unit 310 calculates the degree of similarity of the generated synthetic images between different modalities (S332).

Next, the second training unit 310 concatenate synthetic images whose degree of similarity exceeds the threshold value calculated in step S332 in the channel direction to generate a fusion image (S334).

Next, the second training unit 310 performs training using the synthetic images including the fusion image generated in step S334 and the real environment image as training data, and generates a student network (S336). In this case, an image in which a plurality of real environment images related to different modalities are concatenated in the channel direction may be used as training data.

The example of generating the synthetic image according to the present embodiment has been described with specific examples. By using the synthetic image as described above as training data, it is possible to effectively improve the accuracy of estimation by the generated student network.

When performing processing based on the degree of similarity of synthetic images related to different modalities as illustrated above, it is desirable that the feature quantity distributions of each modality are similar.

However, in reality, there is no guarantee that the feature quantity distributions between modalities will match. Therefore, if no processing is performed, similar images may not be obtained, and even if the noise values used to generate synthetic images are the same, it may mean different distances and directions in the feature quantity space.

In view of the foregoing, the synthetic image according to the present embodiment may be generated based on processing of similarizing the feature quantity distributions related to each modality obtained by inputting the real environment image to the teacher network. The processing may be performed on real environment images related to a plurality of modalities acquired at the same timing and from the same direction.

According to the above-described processing, it is possible to absorb the difference in the feature quantity distribution between modalities and generate a more useful synthetic image as training data.

Figure 16:
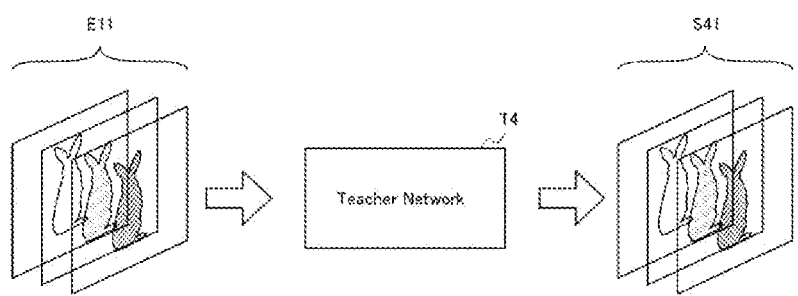
FIG. 16 is a diagram showing an example of processing for similarizing feature quantity distributions related to each modality according to the embodiment.

FIG. 16 is a diagram showing an example of processing for similarizing the feature quantity distributions related to each modality according to the present embodiment. In this processing, first, real environment images related to a plurality of modalities acquired at the same timing and from the same direction are acquired.

In the case of the example shown in FIG. 16, the first training unit 110 generates an image E11 in which a plurality of real environment images acquired as described above are concatenated in the channel direction, and generates a teacher network T4 by machine learning using the image E11 as training data.

By using the teacher network T4 generated as described above, it is possible to generate the synthetic image S41 related to all modalities used for generating the image E11.

In addition, the process of similarizing the feature quantity distributions related to each modality may include a process of decreasing the distance on the feature quantity space between the feature quantity obtained by inputting the real environment image related to a certain modality to the teacher network and the feature quantity obtained by inputting the real environment image related to another modality different from the certain modality to the teacher network.

The processing includes, for example, domain adaptation. For example, when $X_s$ is a feature quantity obtained from real environment images acquired by an RGB camera and $X_t$ is a feature quantity obtained from a real environment image acquired by a ToF camera, the first training unit 110 may perform training so that the distribution of $X_s$ and the distribution of $X_t$ is close to each other.

In addition, the process of similarizing the feature quantity distribution related to each modality may include a process of transforming the feature quantity obtained by inputting the real environment image related to a certain modality to the teacher network into a feature quantity obtained by inputting a real environment image related to another modality different from the certain modality to the teacher network.

The first training unit 110 according to the present embodiment may obtain, for example, a transform matrix that projects a feature quantity related to a certain modality onto a feature quantity related to another modality using a machine learning method or the like, and transform the feature quantity using the transform matrix.

For example, when $X_s$ is a feature quantity obtained from real environment images acquired by an RGB camera and $X_t$ is a feature quantity obtained from a real environment image acquired by a ToF camera, the first training unit 110 can realize the transform of the feature quantity by obtaining such A and B that satisfy $X_t = AX_s + B$. Although a linear regression problem is shown here as an example, the transform matrix may be obtained by a nonlinear regression problem.

As described above, specific examples of the processing for similarizing the feature quantity distributions related to each modality according to the present embodiment are shown. This is just an example, and other means may be used to improve the degree of similarity of the feature quantity distributions related to each modality.

1.5. Estimation Using Student Network

Next, the estimation using the student network in Phase F4 will be described. In Phase F4 according to the present embodiment, the estimation using the student network generated in Phase F3 is carried out. The estimation device 40 according to the present embodiment is an example of an information processing device that estimates an object class using a student network.

Figure 17:
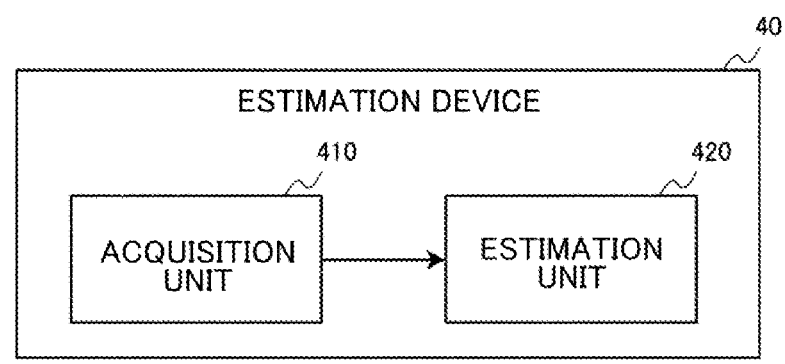
FIG. 17 is a block diagram showing an exemplary configuration of an estimation device 40 according to the embodiment.

FIG. 17 is a block diagram showing an exemplary configuration of the estimation device 40 according to the present embodiment. As shown in FIG. 17, the estimation device 40 according to the present embodiment includes at least an acquisition unit 410 and an estimation unit 420. The estimation device 40 may further include, for example, an operation unit that accepts operations by the user, a display unit that displays various pieces of information, and the like. The estimation device 40 may be mounted on a mobile object such as an automobile.

(Acquisition Unit 410)

The acquisition unit 410 according to the present embodiment acquires an image in a real environment. More specifically, the acquisition unit 410 according to the present embodiment acquires an image by at least one modality among a plurality of modalities used for acquiring the real environment image used for generating the synthetic image used for training the student network used by the estimation unit 420.

For example, when an RGB camera and a ToF camera are used to acquire real environment images used for generating a synthetic image, the acquisition unit 410 acquires an image using at least one of the RGB camera and the ToF camera.

(Estimation Unit 420)

The estimation unit 420 according to the present embodiment uses a student network generated based on a teacher network generated by machine learning using an image stored in a large-scale image database as training data to estimate an object class related to an object included in the input image.

For example, the estimation unit 420 according to the present embodiment may estimate the object class related to the object included in the image acquired by the acquisition unit 410. If there is an image acquired by at least one modality among the modalities used for acquiring the real environment image used for generating the synthetic image, the estimation unit 420 according to the present embodiment can input the image to the student network and output the estimation result.

Figure 18:
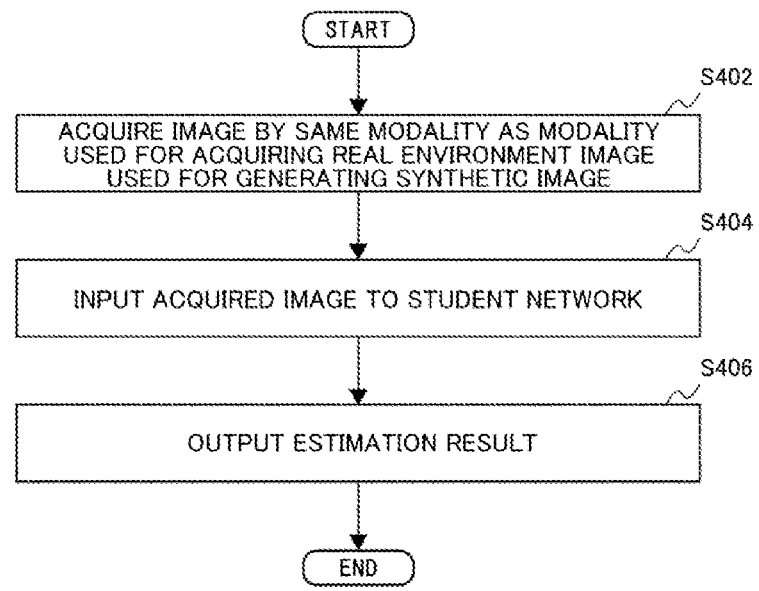
FIG. 18 is a flowchart showing a flow of processing by the estimation device 40 according to the embodiment.

Hereinafter, the flow of estimation by the estimation device 40 according to the present embodiment will be described. FIG. 18 is a flowchart showing the flow of processing by the estimation device 40 according to the present embodiment.

As shown in FIG. 18, first, the acquisition unit 410 acquires an image with the same modality as the modality used for acquiring the real environment image used for generating the synthetic image (S402).

Next, the estimation unit 420 inputs the image acquired in step S402 to the student network, and estimates the object class of the object included in the image (S406).

Subsequently, the estimation unit 420 outputs the estimation result (S406). The estimation result may be displayed on, for example, a display unit included in the estimation device 40 or the mobile object, or may be used for controlling each device (for example, a brake, steering, and the like) included in the mobile object.

2. Exemplary Hardware Configuration

Figure 19:
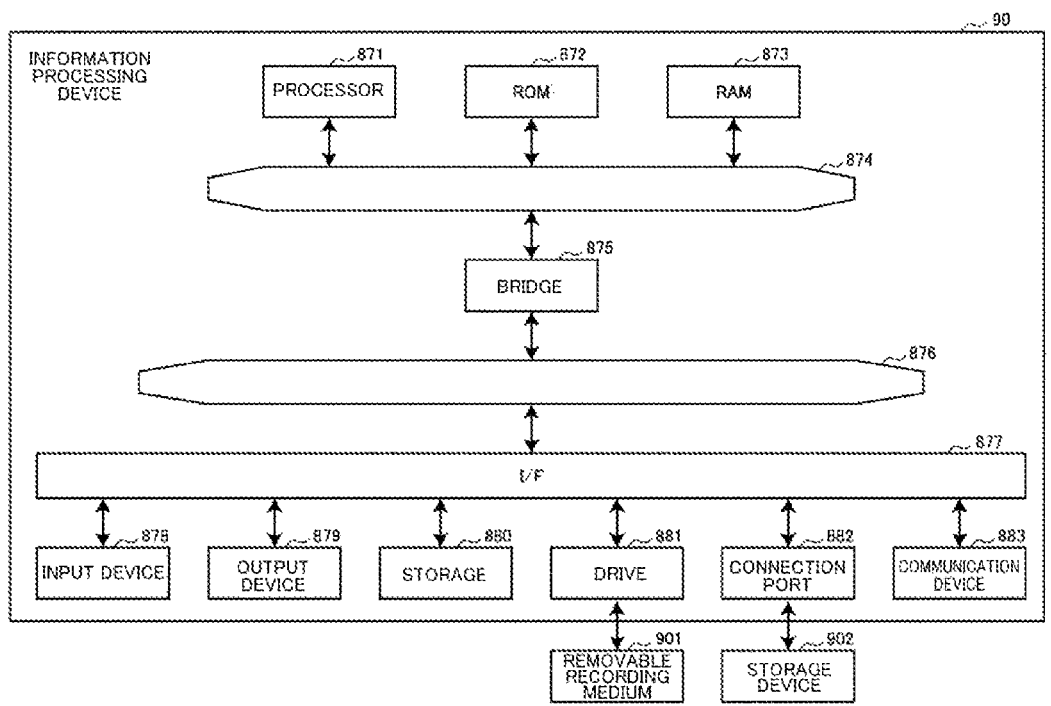
FIG. 19 is a block diagram showing an exemplary hardware configuration of an information processing device 90 according to the embodiment.

Next, an exemplary hardware configuration common to the first training device 10, the image generation device 20, the second training device 30, and the estimation device 40 according to the embodiment of the present disclosure will be described. FIG. 19 is a block diagram illustrating an exemplary hardware configuration of the information processing device 90 according to an embodiment of the present disclosure. The information processing device 90 may be a device having the same hardware configuration as each of the above-described devices. As shown in FIG. 19, the information processing device 90 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. The hardware configuration illustrated herein is an example, and some of the components may be omitted. Further, components other than the components illustrated herein may be further included.

(Processor 871)

The processor 871 functions as, for example, an arithmetic processing device or a control device, and controls all or some of the operations of the components on the basis of various programs recorded in the ROM 872, the RAM 873, the storage 880, or a removable recording medium 901.

(ROM 872, RAM 873)

The ROM 872 is a means for storing a program read into the processor 871, data used for calculation, and the like. In the RAM 873, for example, a program read into the processor 871, various parameters that change as appropriate when the program is executed, and the like are temporarily or permanently stored.

(Host Bus 874, Bridge 875, External Bus 876, Interface 877)

The processors 871, ROM 872, and RAM 873 are connected to each other via, for example, the host bus 874 capable of high-speed data transmission. On the other hand, the host bus 874 is connected to the external bus 876, which has a relatively low data transmission speed, via, for example, the bridge 875. Moreover, the external bus 876 is connected to various components via the interface 877.

(Input Device 878)

For the input device 878, for example, a mouse, a keyboard, a touch panel, buttons, switches, levers, and the like are used. Further, as the input device 878, a remote controller capable of transmitting a control signal using infrared rays or other radio waves may be used. The input device 878 includes a voice input device such as a microphone.

(Output Device 879)

The output device 879 is, for example, a device capable of notifying users of acquired information visually or audibly, such as a display device such as a CRT (Cathode Ray Tube), an LCD, or an organic EL, an audio output device such as a speaker or a headphone, a printer, a mobile phone, a facsimile, or the like. The output device 879 according to the present disclosure includes various vibration devices capable of outputting tactile stimuli.

(Storage 880)

The storage 880 is a device for storing various types of data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, and the like. Naturally, the removable recording medium 901 may be, for example, an IC card equipped with a non-contact type IC chip, an electronic device, or the like.

(Connection Port 882)

The connection port 882 is a port for connecting an external connection device 902 such as a USB (Universal Serial Bus) port, an IEEE1394 port, a SCSI (Small Computer System Interface), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to the network, and is, for example, a communication card for wired or wireless LAN, Bluetooth (registered trademark), or WUSB (Wireless USB), a router for optical communication, a router for ADSL (Asymmetric Digital Subscriber Line), or a modem for various communications.

3. Summary

As described above, the estimation device 40 according to the embodiment of the present disclosure includes the estimation unit 420 that estimates an object class related to an object included in an input image using a student network generated based on a teacher network generated by machine learning using an image stored in a large-scale image database as training data.

The second training device 30 according to the embodiment of the present disclosure includes the second training unit 310 that generates a student network based on a teacher network generated by machine learning using an image stored in a large-scale image database as training data. One of the features of the second training unit 310 according to one embodiment of the present disclosure is to generate a student network by machine learning using synthetic images obtained using a teacher network and real environment images acquired by a plurality of different modalities in the real environment in which estimation using the student network is expected to be executed as training data.

According to the above-described configuration, it is possible to further improve the accuracy of estimation using the student network.

Although the preferred embodiments of the present disclosure have been described in detail with reference to the accompanying figures as described above, the technical scope of the present disclosure is not limited to such examples. It is apparent that those having ordinary knowledge in the technical field of the present disclosure could conceive various modified examples or changed examples within the scope of the technical ideas set forth in the claims, and it should be understood that these also naturally fall within the technical scope of the present disclosure.

For example, the present technique may be applied to images that visualize a sound source. In recent years, various techniques for generating images from a sound source have been developed. For example, the image generation device 20 may generate a synthetic image using images that visualize a sound source, and the second training device 30 may generate a student network using the synthetic image. In this case, the estimation device 40 may also estimate the class related to the sound source using the student network generated as described above.

In addition, the steps related to the processing described in the present specification do not necessarily have to be processed in chronological order in the order described in the flowchart or the sequence diagram. For example, the steps related to the processing of each device may be processed in an order different from the described order, or may be processed in parallel.

The series of processes by each device described in the present specification may be realized using software, hardware, or a combination of software and hardware. The programs constituting the software are stored in advance in, for example, a recording medium (non-transitory media) provided inside or outside each device. Then, each program is read into RAM at the time of execution by a computer and executed by various processors, for example. The recording medium is, for example, a magnetic disk, an optical disc, a magneto-optical disk, or a flash memory. Further, the above computer program may be distributed via, for example, a network without using the recording medium.

Further, the effects described in the present specification are merely explanatory or exemplary and are not intended as limiting. That is, the techniques according to the present disclosure may exhibit other effects apparent to those skilled in the art from the description herein, in addition to or in place of the above effects.

Further, the following configurations also fall within the technical scope of the present disclosure.

(1) An information processing device including an estimation unit that estimates an object class of an object included in an input image using a student network generated based on a teacher network generated by machine learning using images stored in a large-scale image database as training data, wherein the student network is generated by machine learning using, as training data, synthetic images obtained using the teacher network and real environment images acquired by a plurality of different modalities in a real environment in which estimation by the estimation unit is expected to be executed.

(2) The information processing device according to (1), wherein the synthetic images are generated based on adding noise to a feature quantity obtained by inputting the real environment images to the teacher network.

(3) The information processing device according to (2), wherein the synthetic images are generated based on adding noise in a principal component direction in a feature quantity distribution obtained by inputting the real environment images to the teacher network.

(4) The information processing device according to (3), wherein the synthetic images are generated so that a difference between a feature quantity after average pooling obtained by inputting the real environment images to the teacher network and a feature quantity in which noise is added to the feature quantity in the principal component direction decreases.

(5) The information processing device according to any one of (1) to (4), wherein the student network is generated by machine learning using the synthetic images whose degree of similarity between different modalities exceeds a threshold value among the generated synthetic images.

(6) The information processing device according to any one of (1) to (5), wherein the student network is generated by machine learning using the synthetic images whose degree of similarity in a same modality exceeds a threshold value among the generated synthetic images.

(7) The information processing device according to any one of (1) to (6), wherein the student network is generated by machine learning using a fusion image obtained by fusing a plurality of the generated synthetic images.

(8) The information processing device according to (7), wherein the fusion image is generated by fusing a plurality of the synthetic images whose degree of similarity exceeds a threshold value among the generated synthetic images.

(9) The information processing device according to (7) or (8), wherein the fusion image is generated by fusing a plurality of the synthetic images related to a same object class among the generated synthetic images.

(10) The information processing device according to any one of (7) to (9), wherein the fusion image is generated by concatenating the synthetic images related to a plurality of different modalities.

(11) The information processing device according to (10), wherein the fusion image is generated by concatenating a plurality of the generated synthetic images whose degree of similarity between different modalities exceeds a threshold value in a channel direction.

(12) The information processing device according to any one of (1) to (11), wherein the synthetic images are generated based on inputting the real environment images acquired by a corresponding modality to each of a plurality of the teacher networks corresponding to a single modality.

(13) The information processing device according to any one of (1) to (11), wherein the synthetic images are generated based on a process of similarizing feature quantity distributions related to each modality obtained by inputting the real environment images to the teacher network.

(14) The information processing device according to (13), wherein the synthetic images are generated using the teacher network generated by machine learning using an image obtained by concatenating real environment images related to a plurality of modalities acquired at a same timing and from a same direction in a channel direction as training data.

(15) The information processing device according to (13), wherein the synthetic images are generated based on a process of decreasing a distance on a feature quantity space between a feature quantity obtained by inputting the real environment images related to a certain modality to the teacher network and a feature quantity obtained by inputting the real environment images related to another modality different from the certain modality to the teacher network.

(16) The information processing device according to (13), wherein the synthetic images are generated based on a process of transforming a feature quantity obtained by inputting the real environment images related to a certain modality to the teacher network and a feature quantity obtained by inputting the real environment images related to another modality different from the certain modality to the teacher network.

(17) The information processing device according to any one of (1) to (16), further including an acquisition unit that acquires images in the real environment, wherein the estimation unit estimates an object class related to an object included in the image acquired by the acquisition unit.

(18) The information processing device according to (17), wherein the acquisition unit acquires images by at least one modality among a plurality of modalities used for acquiring the real environment images used for generating the synthetic images.

(19) An information processing device including a training unit that generates a student network based on a teacher network generated by machine learning using images stored in a large-scale image database as training data, wherein the training unit generates the student network by machine learning using, as training data, synthetic images obtained using the teacher network and real environment images acquired by a plurality of different modalities in a real environment in which estimation using the student network is expected to be executed.

(20) A program for causing a computer to function as an information processing device including an estimation unit that estimates an object class of an object included in an input image using a student network generated based on a teacher network generated by machine learning using images stored in a large-scale image database as training data, wherein the student network is generated by machine learning using, as training data, synthetic images obtained using the teacher network and real environment images acquired by a plurality of different modalities in a real environment in which estimation by the estimation unit is expected to be executed.

REFERENCE SIGNS LIST

10 First training device
110 First training unit
20 Image generation device
210 Image generation unit
30 Second training device
310 Third training unit
40 Estimation unit
410 Acquisition unit
420 Estimation unit
50 Large-scale DB
60 Real environment DB
70 Generated image DB

The invention claimed is:

1. An information processing device comprising
circuitry configured to estimate an object class of an object included in an input image using a student network generated based on a teacher network generated by machine learning using images stored in a large-scale image database as training data, wherein
the student network is generated by machine learning using, as training data, synthetic images obtained using the teacher network and real environment images acquired by a plurality of different modalities in a real environment in which the estimation by the circuitry is executed, and
the synthetic images are generated based on inputting the real environment images acquired by a corresponding modality to each of a plurality of the teacher networks corresponding to a single modality.

2. The information processing device according to claim 1, wherein the synthetic images are generated based on adding noise to a feature quantity obtained by inputting the real environment images to the teacher network.

3. The information processing device according to claim 2, wherein
the synthetic images are generated based on adding noise in a principal component direction in a feature quantity distribution obtained by inputting the real environment images to the teacher network.

4. The information processing device according to claim 3, wherein
the synthetic images are generated so that a difference between a feature quantity after average pooling obtained by inputting the real environment images to the teacher network and a feature quantity in which noise is added to the feature quantity in the principal component direction decreases.

5. The information processing device according to claim 1, wherein
the student network is generated by machine learning using the synthetic images whose degree of similarity between different modalities exceeds a threshold value among the generated synthetic images.

6. The information processing device according to claim 1, wherein
the student network is generated by machine learning using the synthetic images whose degree of similarity in a same modality exceeds a threshold value among the generated synthetic images.

7. The information processing device according to claim 1, wherein
the student network is generated by machine learning using a fusion image obtained by fusing a plurality of the generated synthetic images.

8. The information processing device according to claim 7, wherein
the fusion image is generated by fusing a plurality of the synthetic images whose degree of similarity exceeds a threshold value among the generated synthetic images.

9. The information processing device according to claim 7, wherein
the fusion image is generated by fusing a plurality of the synthetic images related to a same object class among the generated synthetic images.

10. The information processing device according to claim 7, wherein
the fusion image is generated by concatenating the synthetic images related to a plurality of different modalities.

11. The information processing device according to claim 10, wherein
the fusion image is generated by concatenating a plurality of the generated synthetic images whose degree of similarity between different modalities exceeds a threshold value in a channel direction.

12. The information processing device according to claim 1, wherein the synthetic images are generated based on a process of similarizing feature quantity distributions related to each modality obtained by inputting the real environment images to the teacher network.

13. The information processing device according to claim 12, wherein
the synthetic images are generated using the teacher network generated by machine learning using an image obtained by concatenating real environment images related to a plurality of modalities acquired at a same timing and from a same direction in a channel direction as training data.

14. The information processing device according to claim 12, wherein
the synthetic images are generated based on a process of decreasing a distance on a feature quantity space between a feature quantity obtained by inputting the real environment images related to a certain modality to the teacher network and a feature quantity obtained by inputting the real environment images related to another modality different from the certain modality to the teacher network.

15. The information processing device according to claim 12, wherein
the synthetic images are generated based on a process of transforming a feature quantity obtained by inputting the real environment images related to a certain modality to the teacher network and a feature quantity obtained by inputting the real environment images related to another modality different from the certain modality to the teacher network.

16. The information processing device according to claim 1, wherein
the circuitry is further configured to acquire images in the real environment, and
the circuitry estimates an object class related to an object included in an acquired image.

17. The information processing device according to claim 16, wherein
the circuitry acquires images by at least one modality among a plurality of modalities used for acquiring the real environment images used for generating the synthetic images.

18. An information processing device comprising
circuitry configured to generate a student network based on a teacher network generated by machine learning using images stored in a large-scale image database as training data, wherein
the circuitry generates the student network by machine learning using, as training data, synthetic images obtained using the teacher network and real environment images acquired by a plurality of different modalities in a real environment in which an estimation of an object class of an object included in an input image using the student network is to be executed, and
the synthetic images are generated based on inputting the real environment images acquired by a corresponding modality to each of a plurality of the teacher networks corresponding to a single modality.

19. A non-transitory computer-readable medium having embodied thereon a program, which when executed by a computer causes the computer to perform an information processing method comprising
estimating an object class of an object included in an input image using a student network generated based on a teacher network generated by machine learning using images stored in a large-scale image database as training data, wherein
the student network is generated by machine learning using, as training data, synthetic images obtained using the teacher network and real environment images acquired by a plurality of different modalities in a real environment in which the estimation is executed, and
the synthetic images are generated based on inputting the real environment images acquired by a corresponding modality to each of a plurality of the teacher networks corresponding to a single modality.

* * * * *